(12) United States Patent
Ichinose et al.

(10) Patent No.: US 7,642,666 B2
(45) Date of Patent: Jan. 5, 2010

(54) WIND POWER GENERATION APPARATUS, WIND POWER GENERATION SYSTEM AND POWER SYSTEM CONTROL APPARATUS

(75) Inventors: Masaya Ichinose, Hitachiota (JP); Shinya Oohara, Hitachi (JP); Motoo Futami, Hitachiota (JP)

(73) Assignee: Hitachi, Ltd., Tokyo (JP)

( * ) Notice: Subject to any disclaimer, the term of this patent is extended or adjusted under 35 U.S.C. 154(b) by 120 days.

(21) Appl. No.: 11/751,742

(22) Filed: May 22, 2007

(65) Prior Publication Data

US 2008/0106099 A1 May 8, 2008

(30) Foreign Application Priority Data

Nov. 2, 2006 (JP) .............................. 2006-298371

(51) Int. Cl.
*H02P 9/04* (2006.01)
*F03D 9/00* (2006.01)
*G05F 5/00* (2006.01)

(52) U.S. Cl. .......................................... 290/44; 323/207
(58) Field of Classification Search .................. 290/44; 323/207
See application file for complete search history.

(56) References Cited

U.S. PATENT DOCUMENTS

| | | | | |
|---|---|---|---|---|
| 3,900,792 A | * | 8/1975 | Moltgen | 323/207 |
| 3,968,422 A | * | 7/1976 | Waldmann | 323/207 |
| 4,019,124 A | * | 4/1977 | Moltgen | 323/207 |
| 4,418,380 A | * | 11/1983 | Tanaka et al. | 363/10 |
| 4,529,925 A | * | 7/1985 | Tanaka et al. | 323/207 |
| 4,570,214 A | * | 2/1986 | Tanaka | 363/160 |
| 4,647,837 A | * | 3/1987 | Stemmler | 323/207 |
| 4,670,826 A | * | 6/1987 | Tanaka | 363/10 |
| 4,752,726 A | * | 6/1988 | Aoyama | 323/207 |
| 4,903,184 A | * | 2/1990 | Hirose | 363/37 |
| 5,051,683 A | * | 9/1991 | Hirose et al. | 323/207 |
| 5,138,247 A | * | 8/1992 | Tanoue et al. | 323/207 |
| 5,225,712 A | * | 7/1993 | Erdman | 290/44 |
| 5,351,178 A | * | 9/1994 | Brennen et al. | 363/40 |
| 5,351,180 A | * | 9/1994 | Brennen et al. | 363/71 |
| 5,355,025 A | * | 10/1994 | Moran et al. | 307/105 |
| 5,384,696 A | * | 1/1995 | Moran et al. | 363/40 |
| 5,485,075 A | * | 1/1996 | Mori et al. | 323/207 |
| 5,751,138 A | * | 5/1998 | Venkata et al. | 323/207 |
| 5,808,880 A | * | 9/1998 | Marvin | 363/37 |
| 5,991,173 A | * | 11/1999 | Nishikawa | 363/37 |

(Continued)

FOREIGN PATENT DOCUMENTS

JP  2000-333373  11/2000

(Continued)

*Primary Examiner*—Nicholas Ponomarenko
*Assistant Examiner*—Pedro J Cuevas
(74) *Attorney, Agent, or Firm*—Antonelli, Terry, Stout & Kraus, LLP.

(57) ABSTRACT

An interface device transmits a reactive power command depending on a power system from a voltage regulation device of the power system to a wind power generation apparatus electrically connected to the power system, and the wind power generation apparatus receives the reactive power command. Then, the wind power generation apparatus outputs reactive power according to a value obtained by adding, to a reactive power command, another reactive power command for suppression of voltage fluctuation caused by output power of the wind power generation apparatus.

10 Claims, 9 Drawing Sheets

U.S. PATENT DOCUMENTS

| | | | | |
|---|---|---|---|---|
| 6,025,701 | A * | 2/2000 | Weinhold | 323/207 |
| 6,114,841 | A * | 9/2000 | Hasler et al. | 323/210 |
| 6,577,108 | B2 * | 6/2003 | Hubert et al. | 323/207 |
| 6,674,267 | B2 * | 1/2004 | Wernersson | 323/210 |
| 6,680,602 | B2 * | 1/2004 | Iyoda et al. | 323/207 |
| 6,731,522 | B2 * | 5/2004 | Kawazoe et al. | 363/37 |
| 6,768,277 | B2 * | 7/2004 | Ichinose et al. | 318/140 |
| 6,924,627 | B1 * | 8/2005 | Wobben | 322/20 |
| 7,091,703 | B2 * | 8/2006 | Folts et al. | 323/207 |
| 7,119,452 | B2 * | 10/2006 | Larsen | 290/55 |
| 7,166,928 | B2 * | 1/2007 | Larsen | 290/55 |
| 7,202,638 | B2 * | 4/2007 | Ye et al. | 322/37 |
| 7,268,443 | B2 * | 9/2007 | Kikuchi et al. | 290/44 |
| 7,271,571 | B2 * | 9/2007 | Ye et al. | 322/36 |
| 7,332,894 | B2 * | 2/2008 | Ichinose et al. | 322/29 |
| 7,345,379 | B2 * | 3/2008 | Okayama et al. | 307/45 |
| 7,385,300 | B2 * | 6/2008 | Huff et al. | 290/40 F |
| 7,453,242 | B2 * | 11/2008 | Ichinose et al. | 322/29 |
| 7,508,173 | B2 * | 3/2009 | Zhou et al. | 323/207 |
| 7,531,911 | B2 * | 5/2009 | Rivas et al. | 290/44 |
| 7,569,944 | B2 * | 8/2009 | Oohara et al. | 290/44 |
| 2003/0020419 | A1 * | 1/2003 | Ichinose et al. | 318/140 |
| 2005/0141157 | A1 * | 6/2005 | Okayama et al. | 361/90 |
| 2006/0012181 | A1 * | 1/2006 | Larsen | 290/44 |
| 2006/0028025 | A1 * | 2/2006 | Kikuchi et al. | 290/44 |
| 2007/0024247 | A1 * | 2/2007 | Ichinose et al. | 322/24 |
| 2007/0097565 | A1 * | 5/2007 | Oohara et al. | 361/20 |
| 2007/0126428 | A1 * | 6/2007 | Ye et al. | 324/522 |
| 2007/0135970 | A1 * | 6/2007 | Zhou et al. | 700/286 |
| 2007/0262583 | A1 * | 11/2007 | Kikuchi et al. | 290/44 |
| 2008/0001411 | A1 * | 1/2008 | Ichinose et al. | 290/55 |
| 2008/0106098 | A1 * | 5/2008 | Miller et al. | 290/44 |
| 2008/0143111 | A1 * | 6/2008 | Ichinose et al. | 290/44 |
| 2008/0143113 | A1 * | 6/2008 | Ichinose et al. | 290/44 |
| 2008/0150283 | A1 * | 6/2008 | Rivas et al. | 290/44 |
| 2008/0150285 | A1 * | 6/2008 | Corcelles Pereira et al. | 290/44 |
| 2008/0157530 | A1 * | 7/2008 | Corcelles Pereira et al. | 290/44 |
| 2008/0252076 | A1 * | 10/2008 | Fortmann et al. | 290/44 |
| 2008/0277938 | A1 * | 11/2008 | Oohara et al. | 290/44 |
| 2008/0296898 | A1 * | 12/2008 | Ichinose et al. | 290/44 |
| 2008/0304188 | A1 * | 12/2008 | Ichinose et al. | 361/20 |
| 2009/0021013 | A1 * | 1/2009 | Andresen | 290/44 |
| 2009/0066297 | A1 * | 3/2009 | Ichinose et al. | 322/29 |
| 2009/0085354 | A1 * | 4/2009 | Tan et al. | 290/44 |

FOREIGN PATENT DOCUMENTS

| | | | |
|---|---|---|---|
| JP | 2007267586 A | * | 10/2007 |
| JP | 2008011607 A | * | 1/2008 |
| JP | 2009023368 A | * | 2/2009 |

* cited by examiner

WIND POWER GENERATION APPARATUS, WIND POWER GENERATION SYSTEM AND POWER SYSTEM CONTROL APPARATUS

CROSS-REFERENCE TO RELATED APPLICATION

The present application relates to subject matters described in a co-pending patent application Ser. No. 11/769,753 filed on Jun. 28, 2007 entitled "VARIABLE SPEED WIND POWER GENERATION SYSTEM" by Masaya Ichinose, et al. and assigned to the assignees of the present application.

BACKGROUND OF THE INVENTION

The present invention relates to a wind power generation apparatus, a wind power generation system and a power system control apparatus for supplying to a power system necessary reactive power for the power system.

Normally, a wind power generation apparatus converts wind energy into rotational energy and generates rotational torque at a rotor of a generator. The apparatus produces electric power from induced torque, and outputs it to a power system, thereby converting the wind energy into active power and supplying the active power to user home and factories connected to the power system.

In addition to the active power consumed by resistor components, the power system includes reactive power consumed by inductor components and capacity components of power lines and loads. When the inductor components of power lines and loads are large, the voltage drops at the end of the loads of the system, and when the capacity components of loads are large, the voltage rise. Therefore, to maintain an appropriate value of the voltage, it is necessary to regulate the reactive power.

To attain this, the reactive power is normally regulated by adjusting the voltage of a generator of a system, tap-switching the transformer of a substation etc., and using a power capacitor, a branch reactor, a synchronous phase shifter, etc. In addition, since capacitors and inductance devices for various values are required to continuously control the value of reactive power using capacitors and inductance, there can be an apparatus to be used to continuously control the reactive power.

JP-A-2000-333373 and U.S. Patent Application Publication No. 20050046196 describe an apparatus which outputs reactive power to a power system.

BRIEF SUMMARY OF THE INVENTION

The present invention is to solve the problem that the reactive power has to be regulated without fail when there arises the deficiency or overflow of the reactive power between the main power supply (of a large capacity such as a thermal power station etc.) of a power system and a load of the power system, and the capability of the existing regulating equipment (a voltage regulator of a generator, tap switch of a transformer of a substation etc., a power capacitor, a branch reactor, a synchronous phase shifter) is exceeded.

Since a wind power generation apparatus outputs active power with high fluctuation, the voltage easily fluctuates at a coupling point of wind power generation equipment.

The apparatus described in JP-A-2000-333373 generates a voltage command value to set the reactive power to zero at the power reception point of demanding equipment, or adjusts the reactive power and generates a voltage command value for maintenance of a constant voltage at a power reception point including a load and distributed power supplies, and uses the voltage command value as a command value for voltage control of the distributed power supplies. Therefore, the deficiency or overflow of the reactive power in the entire system is not considered in the controlling process.

Furthermore, in the apparatus described in U.S. Patent Application Publication No. 20050046196, a reactive power command value is supplied from a farm controller, and the deficiency or overflow of the reactive power on the power system side is not considered in the process of controlling the reactive power of the wind power generation apparatus.

The present invention aims at supplying reactive power required to maintain the voltage of a power system at an appropriate value from a wind power generation apparatus to the power system.

The wind power generation apparatus according to the present invention includes: an interface device for receiving a first reactive power command value from a voltage detector provided in a power system; means for generating a second reactive power command value for suppressing fluctuation of output power from a generator; and means for calculating a third reactive power command value from the first reactive power command value and the second reactive power command value, and outputting reactive power on the basis of the third reactive power command value.

The power system control apparatus according to the present invention further includes: a voltage detector for detecting the voltage of a power system; a reactive power command value generation unit for generating a reactive power command value from a voltage detection value of the voltage detector; and a transmission unit for transmitting the reactive power command value to the wind power generation apparatus, suppresses the fluctuation of the output of the generator, and receives reactive power depending on a reactive power command from a wind power generator.

Furthermore, the wind power generation system according to the present invention includes: a voltage detector for detecting a voltage of a power system; a reactive power command value generation unit for generating a first reactive power command value from a voltage detection value of the voltage detector; and a transmission unit for transmitting the first reactive power command value to a wind power generation apparatus. The wind power generation apparatus includes: an interface device for receiving the first reactive power command value; means for generating a second reactive power command value for suppressing fluctuation of output power from a generator; and means for calculating a third reactive power command value from the first reactive power command value and the second reactive power command value, and outputting reactive power on the basis of the third reactive power command value.

According to the present invention, a wind power generation apparatus can supply necessary reactive power for a power system, and suppress voltage fluctuation of a coupling point of the wind power generation apparatus having high output fluctuation, thereby appropriately adjusting the voltage of the power system although the capability of adjustment equipment for a voltage etc. is exceeded.

Other objects, features and advantages of the invention will become apparent from the following description of the embodiments of the invention taken in conjunction with the accompanying drawings.

DESCRIPTION OF THE EMBODIMENTS

To compensate for necessary reactive power in a power system is realized by a method of providing an interface which receives a reactive power command from a power system for a wind power generation apparatus in order to compensate for the output capacity using wind power generation equipment.

Embodiment 1

Figure 1:
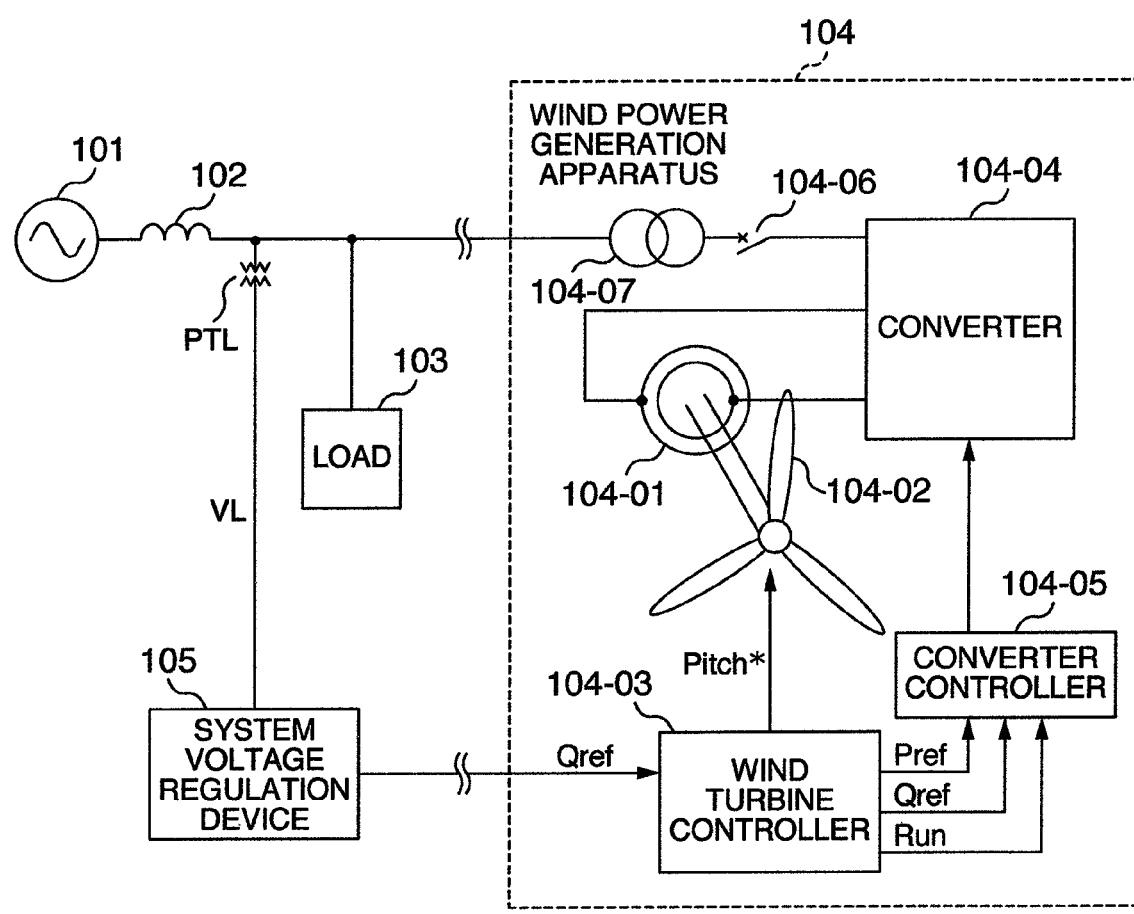
FIG. 1 is an explanatory view of the circuit configuration of the power system and the wind power generation apparatus to which the present invention is applied.

FIG. 1 is a single line diagram showing the configuration of the apparatus and the power system according to the first embodiment of the wind power generation apparatus of the present invention.

First described below is the configuration of the power system. A power generation equipment 101 of the power system has a large capacity, and can be regarded simply as a power supply. Since the electric power from the power generation equipment 101 of the power system is transmitted via power lines, impedance 102 of the power lines is considered. A transformer of a substation etc. is used to convert the voltage of the power lines into a lower voltage, and then a load 103 such as user home, buildings, factories are connected. As with the load 103, a wind power generation apparatus 104 is also connected to the power lines.

A system voltage regulation device 105 is used in a substation. The device regulates the voltage of a load within a predetermined range by regulating the ratio of the number of turns of a transformer, connecting a capacitor, etc.

The system voltage regulation device 105 detects the voltage of the power system, and transmits to the wind power generation apparatus 104 the reactive power command value required to maintain the voltage.

Described next is the configuration of the wind power generation apparatus. The wind power generation apparatus 104 includes mainly a generator (wound-rotor induction generator) 104-01, blades 104-02, a wind turbine controller 104-03, a converter (excitation apparatus) 104-04, and a converter controller 104-05.

The blades 104-02 are mechanically connected to the rotor of the generator 104-01. The rotor winding of the generator 104-01 is electrically connected to the converter 104-04. The stator of the generator 104-01 is electrically connected to the power system through a circuit breaker 104-06 and a transformer 104-07.

The wind turbine controller 104-03 detects the wind speed, controls the angle of the blades 104-02, calculates and outputs an active power command value Pref, outputs a run/stop command value Run, receives a reactive power command value Qref from the system voltage regulation device 105, transmits the received reactive power command value Qref, and the like.

Each command value of the reactive power command value Qref, the active power command value Pref, and the run/stop command value Run is transmitted to the converter controller 104-05. The converter controller 104-05 controls the converter 104-04 according to a command value, and controls the active power and the reactive power between the generator 104-01 and the system.

Figure 2:
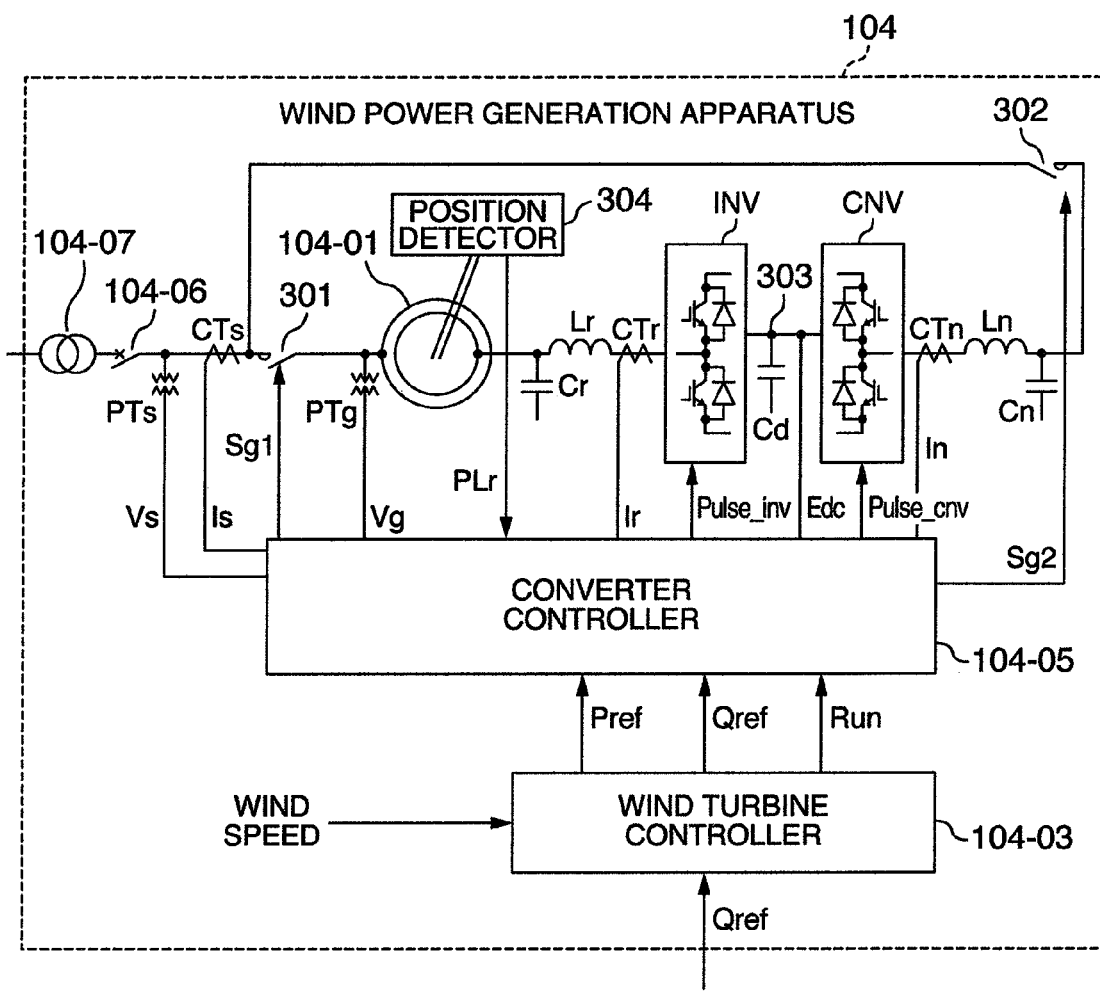
FIG. 2 is an explanatory view showing an example of the configuration of the wind power generation apparatus according to the present invention.

The wind power generation apparatus 104 is described in detail below with reference to FIG. 2.

A three phase output on the stator side of the generator 104-01 is connected to the secondary side of an electromagnetic contactor 301. The primary side of the electromagnetic contactor 301 is connected to the primary side of an electromagnetic contactor 302. The secondary side of the electromagnetic contactor 302 is connected to a converter CNV through an AC filter circuit constituted by a capacitor Cn and a reactor Ln.

A DC circuit 303 of the converter CNV is connected to a DC circuit 303 of a converter INV. The AC output of the converter INV is electrically connected to the rotor winding of the generator 104-01 through the AC filter circuit constituted by a capacitor Cr and a reactor Lr. The primary side of the electromagnetic contactor 301 is also connected to the power system through the circuit breaker 104-06 and the transformer 104-07.

The circuit breaker 104-06 has the function of electrically disconnect the system of the wind power generation apparatus 104 from the system after completely stopping it by, for example, opening the circuit breaker when the electric current value is high to cut off an electric current in order to protect the system of the wind power generation apparatus 104.

The converter INV on the generator side and the converter CNV on the power system side include semiconductor switching element s (thyristor, GTO, IGBT, MOS, SiC, etc.), each being provided with the function of converting an alternating current into a direct current or vice versa.

The AC filter constituted by a capacitor Cn and a reactor Ln installed at the AC output terminal of the converter CNV on the power system side is provided with the function of attenuating a harmonic current and a harmonic voltage.

The rotor of the generator 104-01, to which blades for wind power generation are connected through gears etc. is rotated by wind. A position detector 304 for detecting a rotational position is connected to the rotor and outputs a position signal PLr.

Described below are the wiring and an apparatus for controlling the generated power.

A three phase voltage value and a three phase current value on the secondary side of the circuit breaker 104-06 are converted into a low-voltage voltage detection signal Vs and a low voltage current detection signal Is by a voltage sensor PTs and a current sensor CTs respectively. The low voltage signals Vs and Is are input to the converter controller 104-05. The voltage value between the electromagnetic contactor 301 and the stator of the generator 104-01 is converted into a low voltage signal Vg by the voltage sensor PTg, and input to the converter controller 104-05.

The voltage of a capacity Cd connected to the DC circuit 303 of the converter INV and the converter CNV is converted to a low-voltage DC voltage signal Edc by the voltage sensor. The DC voltage signal Edc is input to the converter controller 104-05.

The detection value Ir of the output current of the converter INV detected by the current sensor CTr and the detection value In of the output current of the converter CNV detected by the current sensor CTn are transmitted to the converter controller 104-05.

The wind turbine controller 104-03 transmits each command of the run/stop command value Run, the active power command value Pref, and the reactive power command value Qref to the converter controller 104-05, and detects the state quantity of the wind turbine and the system to have the function of communicating with external devices.

The converter controller 104-05 receives a detection signal of the output current of the wind power generation apparatus, a detection signal of the output voltage, and a reactive power command from the system voltage regulation device, and calculates an active power command and the reactive power command.

The converter controller 104-05 controls the electromagnetic contactors 301 and 302 according to the signals Sg1 and Sg2 at the calculated active power command and reactive power command. It also outputs pulse signals Pulse_inv and Pulse_cnv for drive-control each of the converters INV and CNV constituted by semiconductor switching elements. At this time, the pulse signals Pulse_inv and Pulse_cnv input to the converters INV and CNV are generated such that the necessary reactive power required by the power system can be output from the wind power generation apparatus and the fluctuation of the output reactive power of the wind power generation apparatus can be suppressed.

The converter CNV controls the DC voltage detection value Edc of the smoothing capacitor Cd to maintain it. To attain this, the converter CNV detects the phase of the voltage detection value Vs and controls the current command value having the same phase as the detected voltage phase, thereby communicating active power with the system and controlling the direct current voltage.

If the energy of a smoothing capacitor is consumed and the DC voltage drops by using the DC power by the converter on the generator side, then the DC voltage control of the converter on the power system side charges the smoothing capacitor Cd using AC power to maintain a constant DC voltage detection value Edc. If the DC voltage detection value Edc rises by the power converter INV charging the DC power, then the DC voltage control of the power converter CNV converts the DC power into the AC power for electric discharge to maintain the constant DC voltage detection value Edc.

Figure 3:
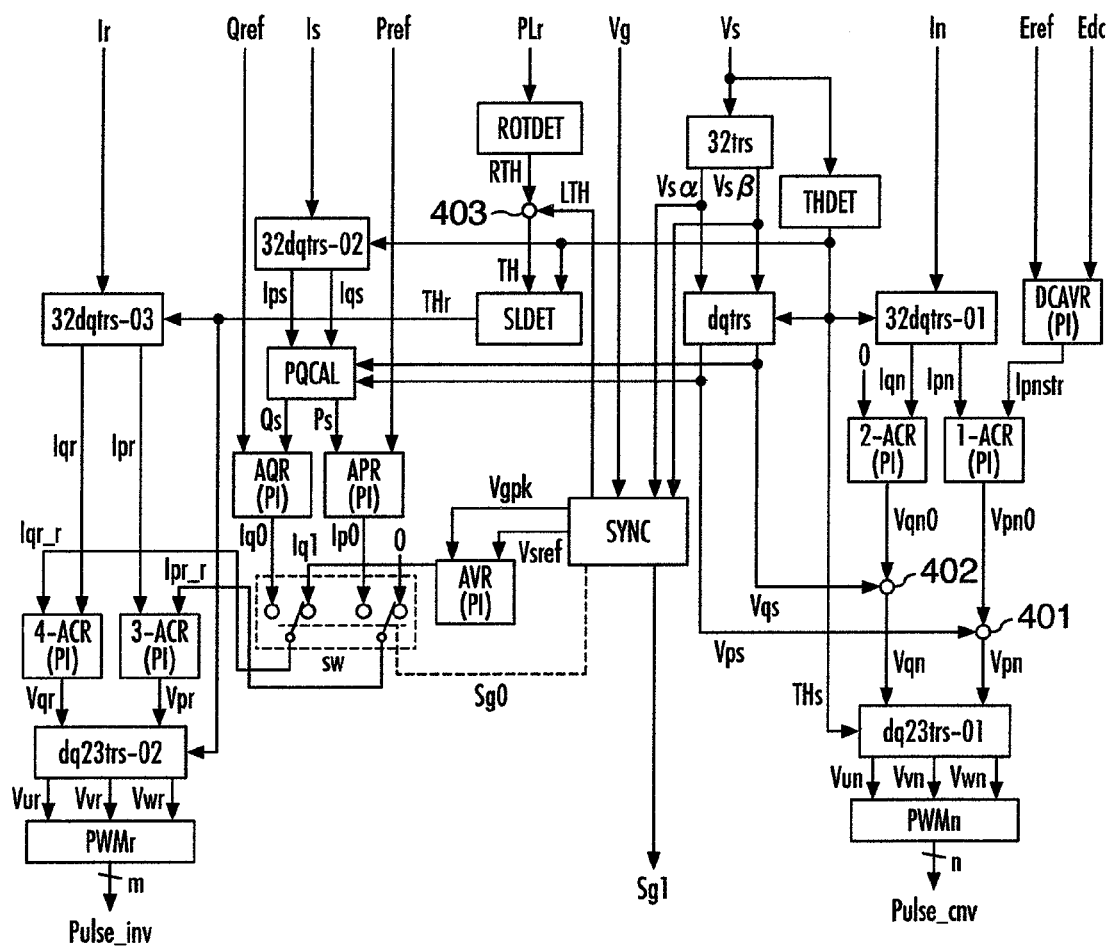
FIG. 3 is an explanatory view showing an example of a method of embodying the converter control according to the present invention.

The detailed function of the converter controller 104-05 is described below with reference to FIG. 3.

The voltage detection value Vs is input to a phase detector THDET and a three-to-two phase transformer 32trs. The phase detector THDET calculates a phase signal THs following the voltage of the power system through, for example, the phase lock loop (PLL) method, and then outputs the phase signal THs (phase signal when the power system U-phase voltage is a sine wave) to three-to-two phase coordinate transformers 32dqtrs-01 and 32dqtrs-02, a rotational coordinate transformer dqtrs, an excitation phase calculating unit SLDET, and a two-to-three phase coordinate transformer dq23trs-01. A DC voltage command value Eref and the DC voltage detection value Edc are input to a DC voltage regulator DCAVR. The DC voltage regulator DCAVR regulates a p-axis current command value (active current command value) Ipnstr of output so that the deviation of the DC voltage detection value Edc from the input DC voltage command value Eref becomes zero, and then outputs the p-axis current command value Ipnstr to a current regulator 1-ACR. The DC voltage regulator DCAVR can be configured by, for example, a proportional-integral controller.

The three-to-two phase coordinate transformers 32dqtrs-01 calculates, from an input current In, a p-axis current detection value Ipn (active current) and a q-axis current detection value Iqn (reactive current) using conversion equations shown as the following equations (1) and (2), and then outputs the p-axis current detection value Ipn and the q-axis current detection value Iqn to the current regulator 1-ACR and the current regulator 2-ACR respectively.

Subscripts u, v, and w denote respective phases. For example, the U-phase current of In is denoted as Inu. This also applies to voltages etc. hereafter.

$$\begin{pmatrix} In\alpha \\ In\beta \end{pmatrix} = \frac{2}{3} \begin{pmatrix} \cos(0) & \cos(2\pi/3) & \cos(4\pi/3) \\ \sin(0) & \sin(2\pi/3) & \sin(4\pi/3) \end{pmatrix} \begin{pmatrix} Inu \\ Inv \\ Inw \end{pmatrix} \quad (1)$$

$$\begin{pmatrix} Ipn \\ Iqn \end{pmatrix} = \begin{pmatrix} \sin(THs) & -\cos(THs) \\ \cos(THs) & \sin(THs) \end{pmatrix} \begin{pmatrix} In\alpha \\ In\beta \end{pmatrix} \quad (2)$$

The current regulator 1-ACR regulates a p-axis voltage command value Vpn0 which is to be output so that the deviation of the p-axis current detection value Ipn from the p-axis current command value Ipnstr becomes zero, and then outputs the p-axis voltage command value Vpn0 to an adder 401. Similarly, the current regulator 2-ACR regulates a q-axis voltage command value Vqn0 which is to be output so that the deviation of the q-axis current detection value Iqn from the q-axis current command value (0 in the figure) becomes zero, and then outputs the q-axis voltage command value Vqn0 to the adder 402. The current regulators (1-ACR and 2-ACR) can be configured with, for example, a proportional-integral controller.

The three-to-two phase transformer 32trs calculates an α-component Vsα and a β-component Vsβ from an input voltage Vs using a conversion equation shown as equation (3), and outputs the result to a rotational coordinate transformer dqtrs. The rotational coordinate transformer dqtrs calculates a p-axis voltage detection value (phase component matching a system voltage vector) Vps and a q-axis voltage detection value (component orthogonal to the p-axis voltage detection value Vps) Vqs by an equation (4), and outputs the values to the adders 401 and 402 respectively.

$$\begin{pmatrix} Vs\alpha \\ Vs\beta \end{pmatrix} = \frac{2}{3} \begin{pmatrix} \cos(0) & \cos(2\pi/3) & \cos(4\pi/3) \\ \sin(0) & \sin(2\pi/3) & \sin(4\pi/3) \end{pmatrix} \begin{pmatrix} Vsu \\ Vsv \\ Vsw \end{pmatrix} \quad (3)$$

$$\begin{pmatrix} Vps \\ Vqs \end{pmatrix} = \begin{pmatrix} \sin(THs) & -\cos(THs) \\ \cos(THs) & \sin(THs) \end{pmatrix} \begin{pmatrix} Vs\alpha \\ Vs\beta \end{pmatrix} \quad (4)$$

The adder 401 adds the p-axis voltage command value Vpn0 and the p-axis voltage detection value Vps and then outputs the result to the two-to-three phase coordinate transformer dq23*trs*-01. Similarly, the adder 402 adds the q-axis voltage command value Vqn0 and the q-axis voltage detection value Vqs and then outputs the result to the two-to-three phase coordinate transformer dq23*trs*-01.

The two-to-three phase coordinate transformer dq23*trs*-01 inputs the phase signal THs and the results Vpn and Vqn of the adders, calculates voltage command values Vun, Vvn, and Vwn using conversion equations shown as the following equations (5) and (6), and outputs them to a PWM calculating unit PWMn.

$$\begin{pmatrix} Va \\ Vb \end{pmatrix} = \begin{pmatrix} \sin(THs) & \cos(THs) \\ -\cos(THs) & \sin(THs) \end{pmatrix} \begin{pmatrix} Vpn \\ Vqn \end{pmatrix} \quad (5)$$

$$\begin{pmatrix} Vun \\ Vvn \\ Vwn \end{pmatrix} = \begin{pmatrix} \cos(0) & \sin(0) \\ \cos(2\pi/3) & \sin(2\pi/3) \\ \cos(4\pi/3) & \sin(4\pi/3) \end{pmatrix} \begin{pmatrix} Va \\ Vb \end{pmatrix} \quad (6)$$

The PWM calculating unit PWMn uses a pulse width modulation system, calculates a gate signal Pulse_cnv for turning on/off n semiconductor elements constituting the converter CNV from the input voltage commands Vun, Vvn, and Vwn, and outputs the result to the converter CNV.

The revolution speed and the phase signal PLr indicating the position of the generator 104-01 are input to a rotational phase detector ROTDET. The rotational phase detector ROTDET counts the pulse PLr of a phase signal and converts it into a phase signal, resets the phase signal to 0 by one pulse per rotation (for example, a Z phase pulse for the encoder in the ABZ system), and outputs a non-overflowing phase signal RTH of 0 to 360° to an adder 403.

The phase signal RTH and an output phase signal LTH of a synchronization controller SYNC are added by the adder 403 to form a phase signal TH. The phase signal TH is input to the excitation phase calculating unit SLDET together with the phase signal THs.

The excitation phase calculating unit SLDET subtracts the phase signals TH and THs (THr=THs−TH), multiplies pairs of poles of the generator, and outputs the phase signal THr of the electrical angular frequency of the rotor of the generator.

A power calculating unit PQCAL converts a system current Is through conversion matrices shown as equations (1) and (2) described above; inputs an obtained p-axis current Ips (with the same direction as the U-phase vector of the system voltage), a q-axis current Iqs perpendicularly intersecting with the U-phase vector of the system voltage, the p-axis voltage detection value Vps, and a q-axis voltage detection value Vqs; and calculates active power Ps and reactive power Qs of the system based on the following equations (7) and (8).

$$Ps = 3(Vps \times Ips + Vqs \times Iqs)/2 \quad (7)$$

$$Qs = 3(-Vps \times Iqs + Vqs \times Ips)/2 \quad (8)$$

An active power regulator APR inputs the active power Ps and active power command value Pref of the wind power generation apparatus, and then outputs an active current command value Ip0 so that the deviation of the active power detection value Ps from the active power command value Pref becomes zero. In this example, an active power command is described, but in the case of a torque command, it is possible to perform control by multiplying a torque command by the revolution speed of a generator to convert it into an active power command. The active power control is, unlike the torque control, performed such that output power can be constant without an effect of the fluctuation of the revolution speed.

The reactive power command value Qref from the system voltage regulation device 105 and the reactive power command value dQ for suppressing the voltage fluctuation caused by the active power Ps of the wind power generation apparatus are added up. For example, dQ is generated by α×Ps (α is proportional factor). A sum Qref1 of the respective reactive power command values and the reactive power Qs are input to the reactive power regulator AQR, and an excitation current command value Iq0 of the output is output so that the deviation between the power command value Qref1 and the reactive power Qs can be 0. The power regulators APR and AQR can be configured by, for example, a proportional integrator.

In this calculating method, while reactive power short in a system is being compensated for, the voltage fluctuation caused by the active power fluctuation output by the wind power generation apparatus can also be compensated for. The current command values Ip0 and Iq0 of the output of active and reactive power regulators are input to a switch SW.

The switch SW determines whether or not the output of the power regulators APR and AQR is used or whether or not zero is used for an active current command value and the output Iq1 of the voltage regulator AVR is used for an excitation current command value. The SW uses zero for an active current command value and the output of the voltage regulator for an excitation current command value before the electromagnetic contactor 301 is powered up, and selects the output of each power regulator after the electromagnetic contactor 301 is powered up. "Before powering up the electromagnetic contactor 301" refers to a voltage synchronous operation period in which a generator stator voltage is synchronous with a system voltage.

The voltage regulator AVR is described below. The voltage regulator AVR uses the amplitude value Vgpk of the generator stator voltage Vg as a feedback value, inputs the amplitude command value Vsref, obtained through a filter for the amplitude value of the system voltage Vs, as a command value, and outputs the excitation current command value Iq1 so that the deviation of the amplitude value Vgpk of the generator stator voltage Vg from the amplitude command value Vsref becomes zero. The voltage regulator AVR can be configured with, for example, a proportional-integral controller. The voltage regulator AVR, operated with the electromagnetic contactor 301 opened, regulates an excitation current command value for making a current flow on the secondary side of the generator 104-01 from the converter INV in order to match the amplitude value of the stator voltage of the generator Gen with the amplitude value of the system voltage.

Furthermore, the synchronization controller SYNC has the function of determining from the command value Vsref and the amplitude value Vgpk of the generator stator voltage whether or not the voltage amplitude of the generator is synchronous, the function of outputting a phase correction signal LTH for correction when a system voltage is different in phase from a stator voltage, and the function of determining whether or not the phases of the system voltage and the stator voltage are in a predetermined range and synchronous with each other, and outputs an operation signal Sg1 of a circuit breaker and a control switch signal Sg0.

Thus, before the generator 104-01 is connected to the power system, it can be synchronous with the system voltage, and after it is connected to the power system, control can be quickly switched to power control.

The three-to-two phase coordinate transformer 32*dqtrs*-03 calculates a q-axis current detection value Iqr (excitation current component) and a p-axis current detection value Ipr (active current component) and then output the q-axis current detection value Iqr to a current regulator 4-ACR and the p-axis current detection value Ipr to a current regulator 3-ACR by using the following conversion equations (9) and (10) from the input current Ir and the phase Thr of the rotor.

$$\begin{pmatrix} Ir\alpha \\ Ir\beta \end{pmatrix} = \frac{2}{3} \begin{pmatrix} \cos(0) & \cos(2\pi/3) & \cos(4\pi/3) \\ \sin(0) & \sin(2\pi/3) & \sin(4\pi/3) \end{pmatrix} \begin{pmatrix} Iru \\ Irv \\ Irw \end{pmatrix} \quad (9)$$

$$\begin{pmatrix} Ipr \\ Iqr \end{pmatrix} = \begin{pmatrix} \sin(THs) & -\cos(THs) \\ \cos(THs) & \sin(THs) \end{pmatrix} \begin{pmatrix} Ir\alpha \\ Ir\beta \end{pmatrix} \quad (10)$$

The current regulator 4-ACR regulates a q-axis voltage command value Vqr which is to be output so that the deviation of the q-axis current detection value Iqr from the q-axis current command value Iq1 or Iq0 becomes zero. Similarly, the current regulator 3-ACR regulates a p-axis voltage command value Vpr which is to be output so that the deviation of the p-axis current detection value Ipr from the p-axis current command value Ip1 or Ip0 becomes zero. Each voltage regulator can be configured with, for example, a proportional integrator.

The p-axis voltage command value Vpr and q-axis voltage detection value Vqr are input to a two-to-three phase coordinate transformer dq23*trs*-02. The two-to-three phase coordinate transformer dq23*trs*-02 calculates voltage command value Vur, Vvr, and Vwr (to be output by the two-to-three phase coordinate transformer dq23*trs*-02) from the phase signal THr and each input value described above, based on the following conversion equations (11) and (12), and then outputs the voltage command values to the PWM calculating unit PWMr.

$$\begin{pmatrix} Va \\ Vb \end{pmatrix} = \begin{pmatrix} \sin(THr) & \cos(THr) \\ -\cos(THr) & \sin(THr) \end{pmatrix} \begin{pmatrix} Vpr \\ Vqr \end{pmatrix} \quad (11)$$

$$\begin{pmatrix} Vur \\ Vvr \\ Vwr \end{pmatrix} = \begin{pmatrix} \cos(0) & \sin(0) \\ \cos(2\pi/3) & \sin(2\pi/3) \\ \cos(4\pi/3) & \sin(4\pi/3) \end{pmatrix} \begin{pmatrix} Va \\ Vb \end{pmatrix} \quad (12)$$

The PWM calculating unit PWMr calculates a gate signal Pulse_inv, which turns on and off m semiconductor elements configuring the converter INV, from input voltage commands Vur, Vvr, and Vwr through the pulse-width modulation method, and then outputs the gate signal to the converter INV (where m indicates a positive integer).

Next, the algorithm of the system voltage regulation device 105 is described below with reference to FIG. 4. As an algorithm of the system voltage regulation device 105, when control is started (S450), the system voltage regulation device 105 detects a system voltage value VL on the load side at user home, for example, and compares the system voltage value VL with a upper limit predetermined value (S452). If the system voltage value VL is higher than the upper limit predetermined value, a value of a constant A is added (S454).

When the system voltage value VL is lower than the upper limit predetermined value, the device compares the system voltage value VL with the lower limit predetermined value (S456). If the system voltage value VL is lower than the lower limit predetermined value, the value of the constant A is subtracted (S458). If the system voltage value VL is higher than the lower limit predetermined value, no addition or subtraction is made to the value of the constant A (S460).

Then, the value of the reactive power command value Qref is added to the product of a predetermined value Q, the constant A, and a change width value Qstep, and the sum is output (S462).

Figure 4:
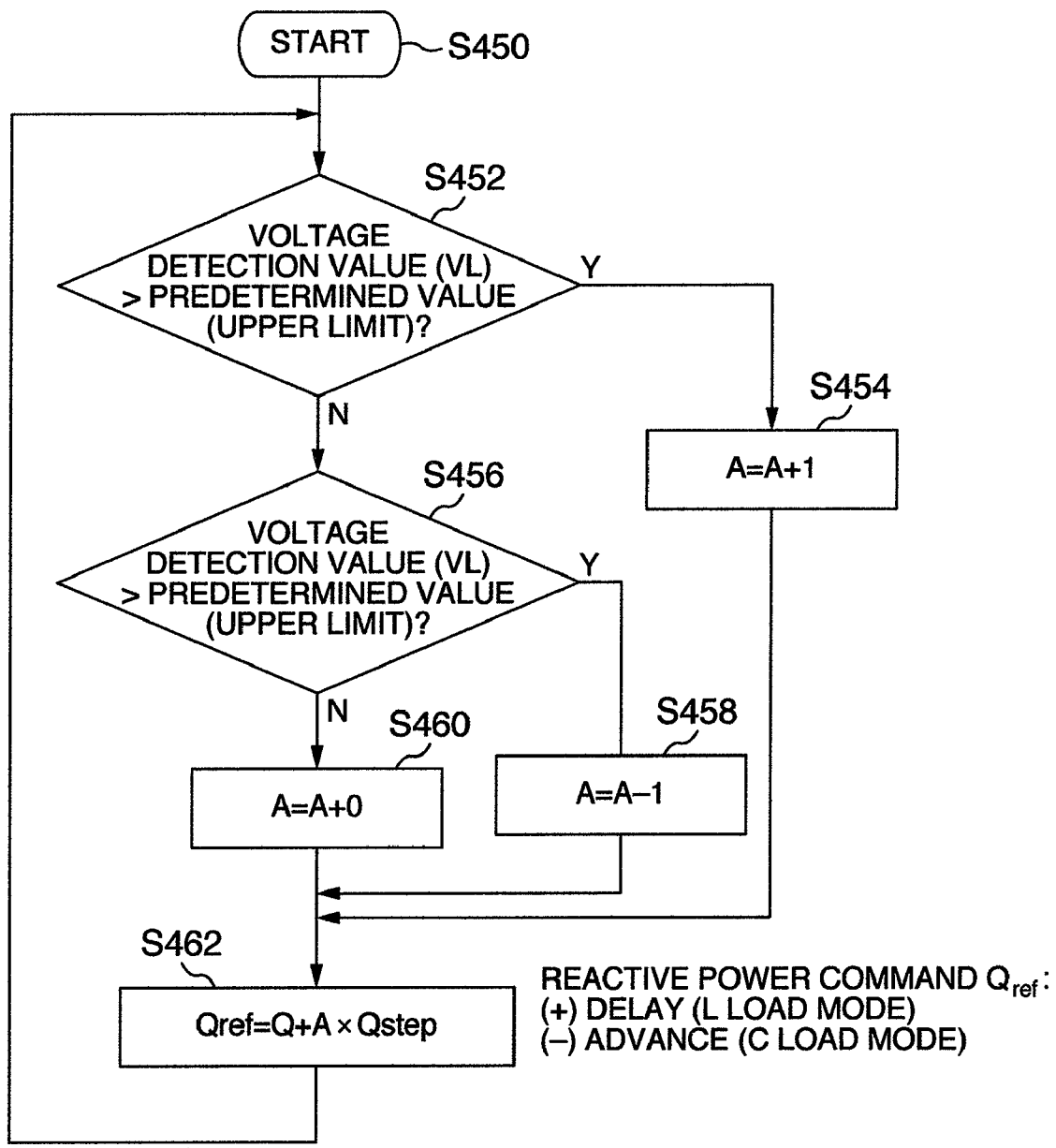
FIG. 4 is an explanatory view of generating reactive power of the system voltage regulation device according to the present invention.

As shown in FIG. 4, the system voltage regulation device 105 detects the system voltage value VL on the load side, for example, at user home. It changes the reactive power command value Qref toward the forward direction when the voltage drops, and for delay reactive power when the voltage rises, and generates a reactive power command value such that the system voltage can be within a predetermined range.

The generated reactive power command value Qref is transmitted to the wind power generation apparatus 104 in a communication method using wires, radio, etc. The wind power generation apparatus 104 outputs reactive power according to a received reactive power command value. In the present embodiment, the reactive power command value calculated by the system voltage regulation device 105 is transmitted to the wind power generation apparatus 104. However, the voltage detection value detected by the system voltage regulation device 105 can be transmitted to the wind power generation apparatus 104, and the wind power generation apparatus can calculate the reactive power command value.

Thus, a system voltage can be regulated by the wind power generation apparatus outputting reactive power according to the reactive power command value from the equipment on the power system side, and a synchronous phase shift unit, a power capacitor, etc. can be eliminated.

Figure 5:
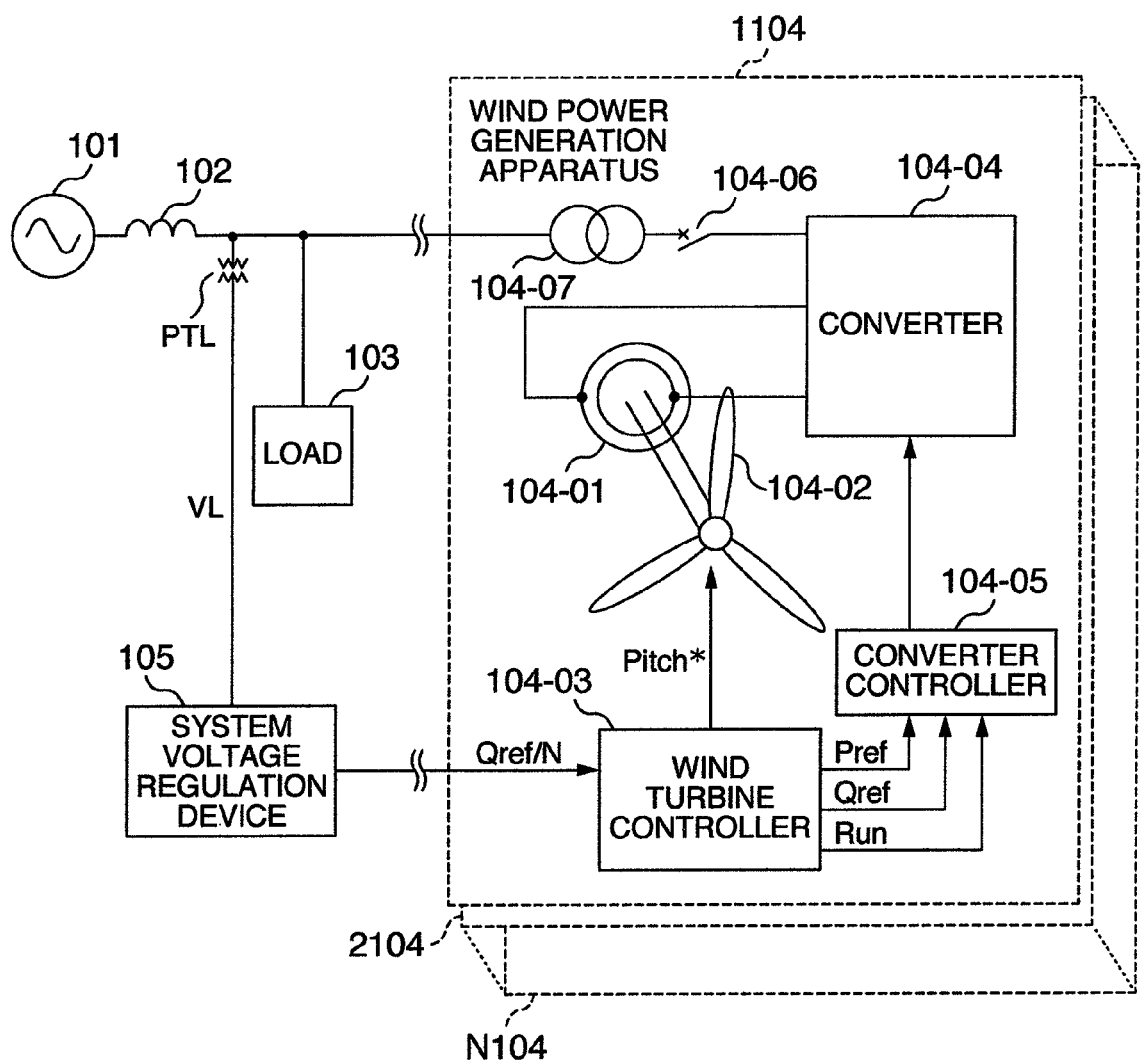
FIG. 5 is an explanatory view of the circuit configuration of the system having a plurality of wind power generation apparatuses.

In addition, as shown in FIG. 5, in a wind farm in which a plurality of wind power generation apparatuses 1104, 2104, . . . , N104 (N is a positive integer) are installed and centrally managed, a controller for centrally managing and controlling the entire farm can receive a reactive power command value Qref, and distribute the reactive power command value Qref to the wind power generation system operating in the farm. For example, when there are N operating apparatuses, the reactive power command value for command of one apparatus can be 1/N, or a wind power generation apparatus having a small amount of power generation can be set for larger output of reactive power.

Figure 6:
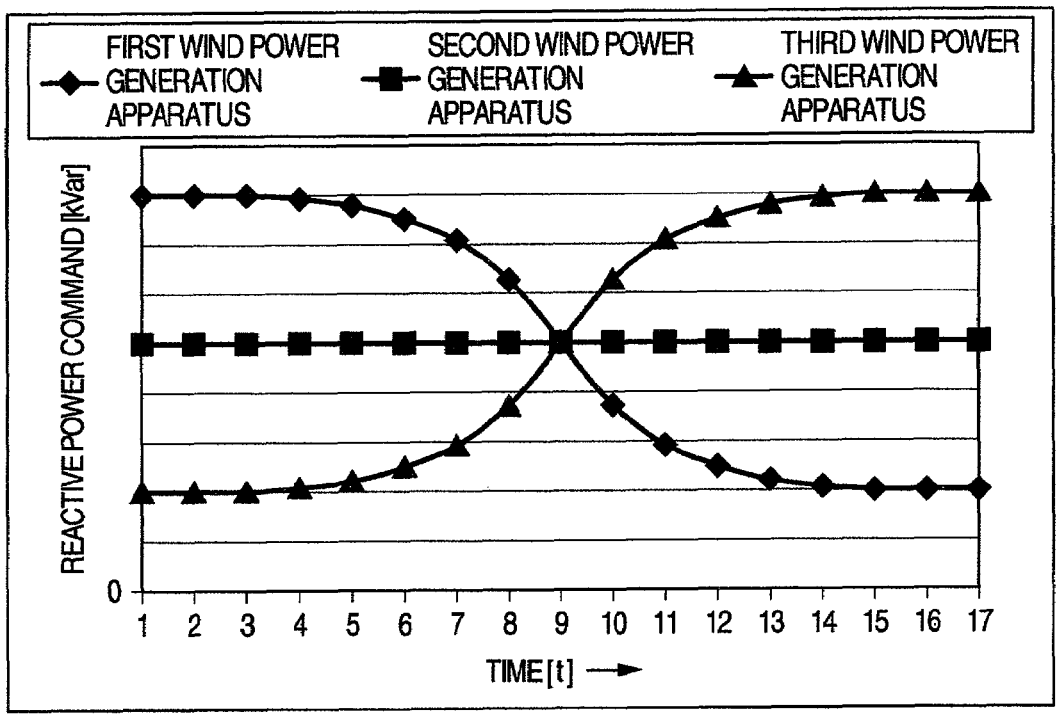
FIG. 6 shows the relationship between the reactive power command and the output active power in the system having a plurality of wind power generation apparatuses.
Figure 6:
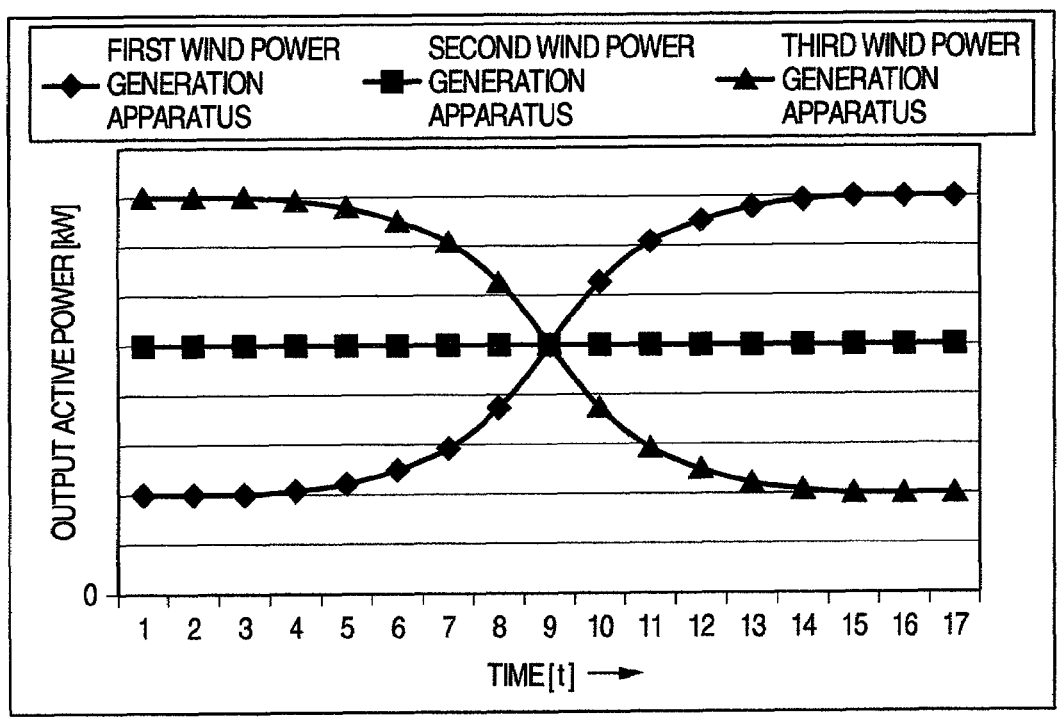

FIG. 6 shows an embodiment of the relationship between the reactive power command value Qref distributed to each wind power generation apparatus and the active power output by each wind power generation apparatus when a reactive power command value Qref is distributed to a wind power generation system operating in a wind farm in which a plurality of wind power generation apparatuses are installed and centrally managed.

As shown in FIG. 6, a wind power generation apparatus having relatively large active power output in the farm is assigned a reactive power command value smaller than that assigned to other wind power generation apparatuses. On the other hand, a wind power generation apparatus having relatively small active power output in the farm is assigned a reactive power command value larger than that assigned to other wind power generation apparatuses.

Electric power can be generated without reducing the active power of the wind power generation apparatuses by transmitting a command value such that a wind power generation apparatus having smaller active power output can output large reactive power.

In this system, a wind power generation apparatus having large output of active power has no room to expand the output of the reactive power, and a wind power generation apparatus having small output of active power has room to expand the output of the reactive power.

Thus, the wind power generation apparatus using a wound-rotor induction generator can independently control the active power and reactive power on the generator side, but the supplement for the deficiency can be provided by the converter CNV directly connected to the system when the output of reactive power is short.

Embodiment 2

The embodiment 1 describes a wind power generation apparatus in which a wound-rotor induction generator is connected to a system through a converter. However, the present invention can also be applied to a wind power generation apparatus using an inductive generator and a synchronous generator as shown in FIG. 6. The embodiment 2 describes a mode for embodying the present invention using a synchronous generator.

Figure 7:
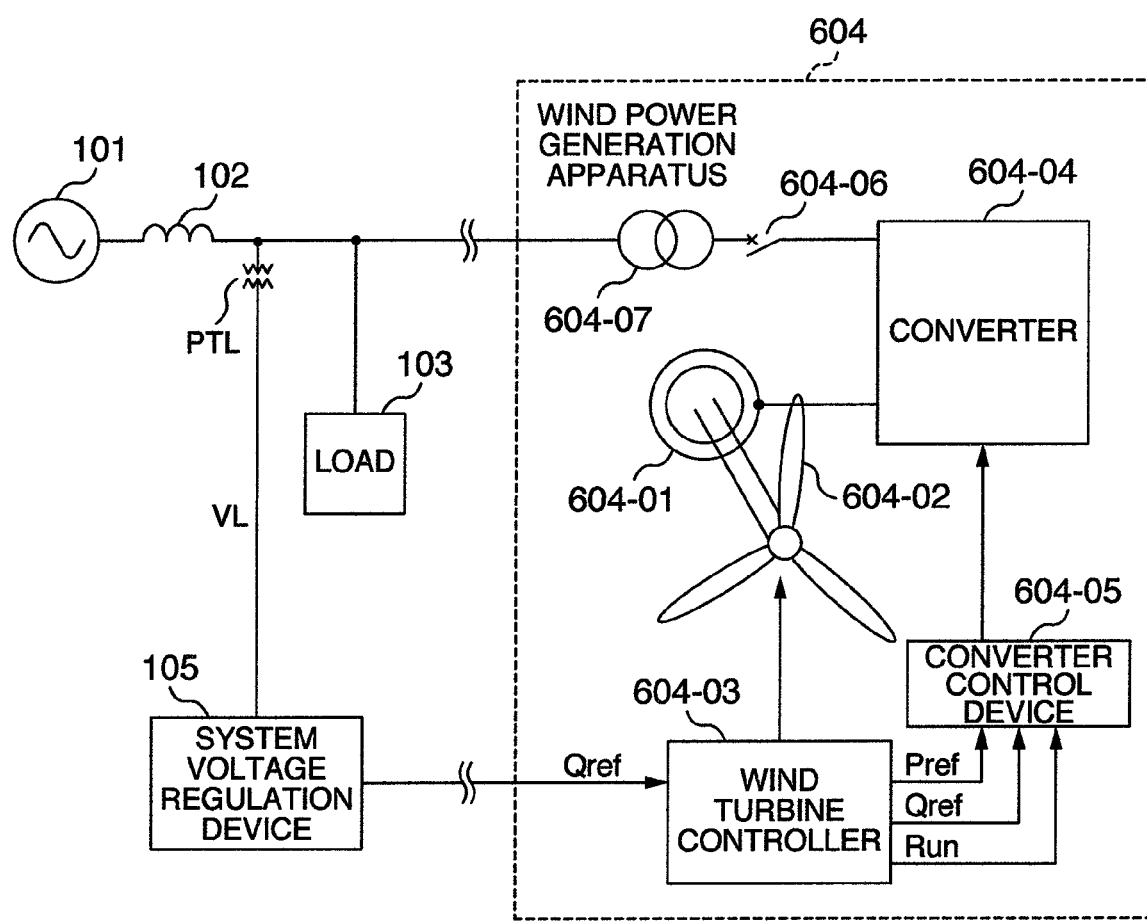
FIG. 7 is an explanatory view of a circuit configuration when a synchronous generator is used for a power system and a wind power generation apparatus.

In a wind power generation apparatus 604 as shown in FIG. 7, for example, a permanent magnetic generator is used, and a converter performs an AC-DC-AC transform on the power produced from the generator and outputs the power to a power system.

Figure 8:
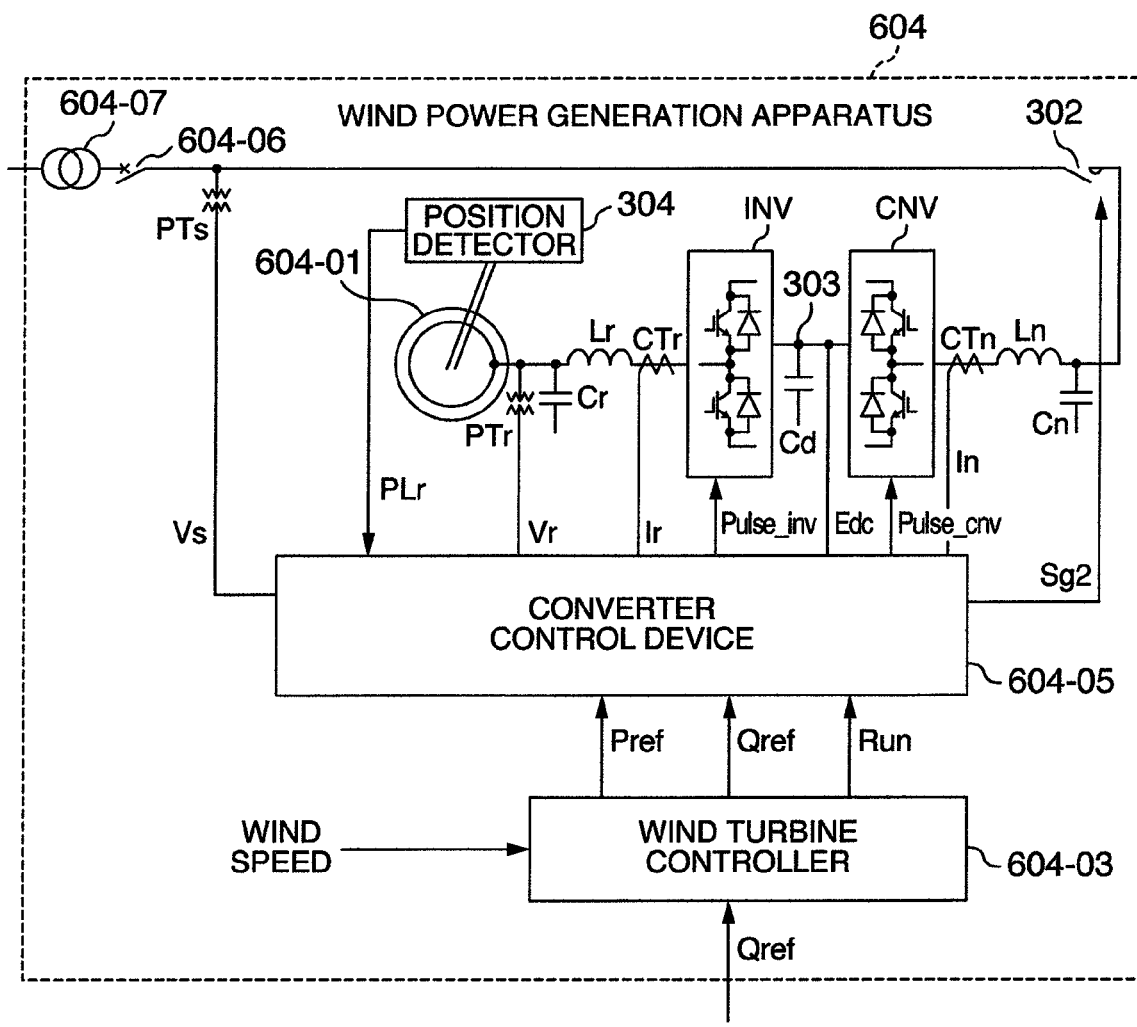
FIG. 8 is an explanatory view of the configuration of the wind power generation apparatus according to the embodiment shown in FIG. 7.
Figure 9:
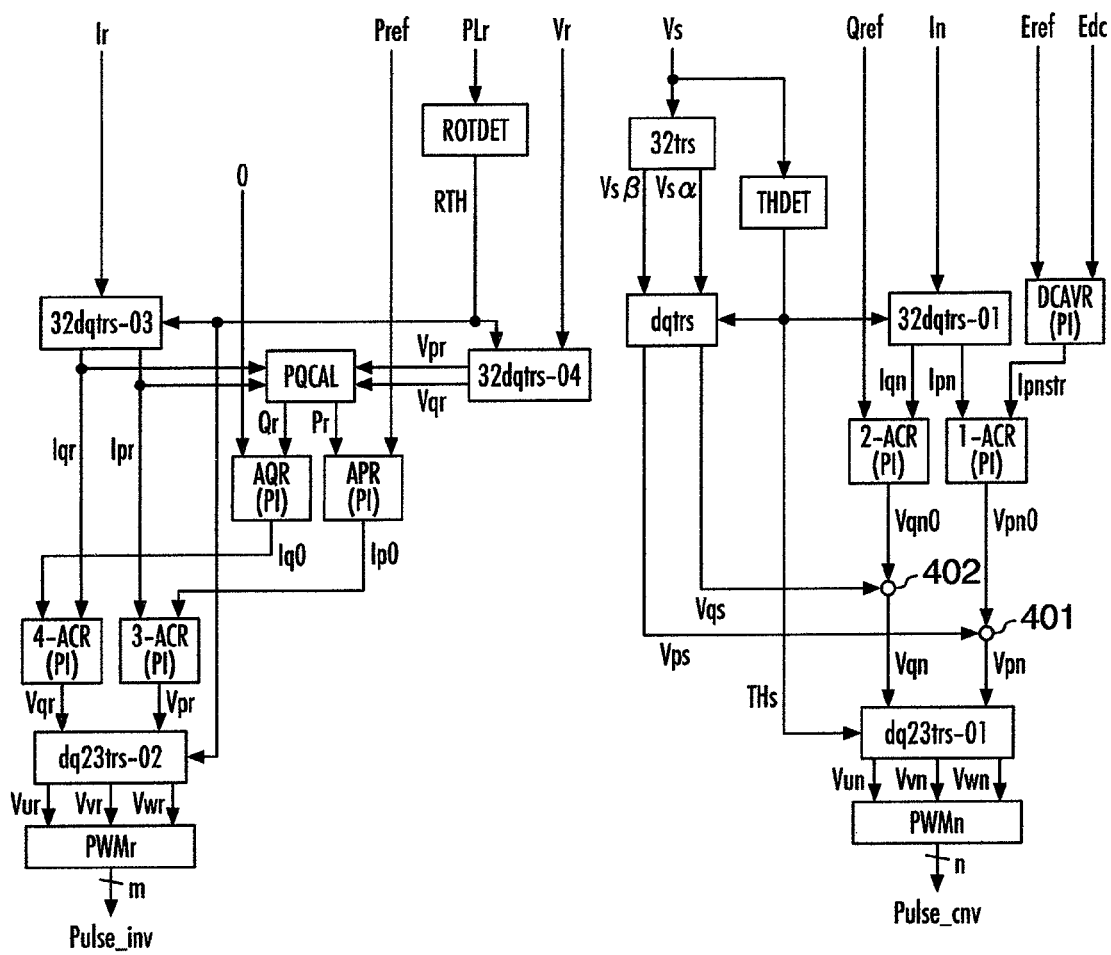
FIG. 9 is an explanatory view showing the detailed configuration of the converter control device.

The function of a converter control device 604-05 of the wind power generation apparatus 604 is described below with reference to FIGS. 8 and 9. The components having identical control functions are assigned the identical reference numerals.

The difference in control of the converter control device 604-05 from the converter CNV on the system side is that the command value input to the reactive current regulator 2-ACR is a reactive power command value in the converter control device 604-05.

The phase signal PLr indicating the revolution speed and position of the generator 604-01 is input to the rotational phase detector ROTDET. The definite difference from the converter controller 104-05 shown in FIG. 3 is that the rotational phase RTH is used as a phase signal as is in the phase detecting method of the generator 604-01.

The power calculating unit PQCAL transforms the current detection value Ir detected by the current sensor CTr by the transform matrix shown in equations (1) and (2), inputs the obtained p-axis current Ipr (in the same direction as the U-phase vector of the generator voltage), q-axis current Iqr orthogonal to the U-phase vector of the system voltage, and the p-axis voltage Vpr and the q-axis voltage Vqr obtained using the same transform equations as the equations (3) and (4) on the generator voltage Vr, and calculates the active power detection value Pr and the reactive power detection value Qr of the generator as by the equations (7) and (8).

The active power regulator APR inputs the active power detection value Pr and the output power command Pref of the wind power generation apparatus, and outputs the output active current command value Ip0 such that the deviation of the power command value Pref from the active power detection value Pr can be zero.

The reactive power regulator AQR is used to regulate the power factor of a generator. Zero is input as a command value to maintain the power factor of 1. Zero is input as the reactive power detection value Qr and a reactive power command of the wind power generation apparatus, and the excitation current command value Ip0 is output for control.

The three-to-two phase coordinate transformer 32$dqtrs$-03 uses the transform equations shown by the equations (9) and (10) and calculates the p-axis current detection value Ipr (active current components) and q-axis current detection value Iqr (excitation current components) from the input current detection value Ir and the phase RTH of the rotor, and outputs the q-axis current detection value Iqr to the current regulator 4-ACR and the p-axis current detection value Ipr to the current regulator 3-ACR.

The current regulator 4-ACR regulates the q-axis voltage command value Vqr of the output such that the deviation of the q-axis current command value Iq1 or Iq0 from the q-axis current detection value Iqr can be 0, and the current regulator 3-ACR regulates the p-axis voltage command value Vpr of the output such that the deviation of the p-axis current command value Ip0 from the active current detection value Ipr can be 0.

The p-axis voltage command value Vpr and the q-axis voltage detection value Vqr are input to the two-to-three phase coordinate transformer dq23$trs$-02, and the two-to-three phase coordinate transformer dq23$trs$-02 calculates, from phase signal RTH and each input value, the voltage command values Vur, Vvr, and Vwr output by the transformer dq23$trs$-02 by the transform equations shown by the equations (10) and (11), and outputs the results to the PWM calculating unit PWMr.

The PWM calculating unit PWMr calculates from the input voltage commands Vur, Vvr, and Vwr a gate signal Pulse_inv for turning on/off of m semiconductor elements forming the converter INV by the pulse width modulation system, and outputs the result to the converter INV.

In the embodiment 2, the active power output by the converter CNV directly connected to a system is regulated to match the input active power from the generator side, and the reactive power can be independently controlled from the active power depending on the condition of the system. Therefore, the same control can be performed also when an inductive generator is used as a generator.

Thus, according to the reactive power command value from the equipment on the system side, a system voltage can be regulated by output reactive power from a wind power generation apparatus, and the equipment such as a synchronous phase shifter or a power capacitor can be eliminated.

Furthermore, when a plurality of wind power generation apparatuses are connected to power system, a power command value is distributed such that a wind power generation apparatus having small active power can output large reactive power, thereby efficiently supplying reactive power without reducing the active power of the wind power generation apparatus.

According to the present invention, a wind power generation apparatus can supply necessary reactive power to a power system and suppress the voltage fluctuation of the system. The present invention can also be applied to a power supply in which output power fluctuates due to poor control of input energy in addition to a wind power generation, for example, a solar energy generator which utilizes natural energy.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A wind power generation apparatus having a wind turbine which receives wind and rotates, a generator which generates electric power by the rotating wind turbine, and a power converter which converts the electric power generated by the generator, wherein the wind power generation apparatus is electrically connected to a power system, and comprises:

an interface device for receiving a first reactive power command value generated from a voltage detection value detected by a voltage detector provided for the power system;

means for generating a second reactive power command value for suppression of voltage fluctuation by fluctuating output power of the generator;

reactive power command value addition means for adding the first reactive power command value to the second reactive power command value; and means for outputting reactive power according to a third reactive power command value output by the reactive power command value addition means.

2. The wind power generation apparatus according to claim 1, wherein when a plurality of wind power generation apparatuses are electrically connected to the power system, a first wind power generation apparatus having small output active power in the plurality of wind power generation apparatuses outputs larger reactive power than a second wind power generation apparatus having large output active power.

3. The wind power generation apparatus according to claim 1, wherein when the plurality of wind power generation apparatuses are electrically connected to the power system, a first wind power generation apparatus having large output active power in the plurality of wind power generation apparatuses outputs smaller reactive power than a second wind power generation apparatus having small output active power.

4. The wind power generation apparatus according to claim 1, wherein:

the interface device receives a delay reactive power command value when the voltage detection value of the voltage detector is higher than a predetermined value;

the interface device receives an advance reactive power command value when the voltage detection value is lower than the predetermined value; and reactive power is output to the power system in such a way that the voltage detection value is within a predetermined range.

5. The wind power generation apparatus according to claim 1, further comprising generated power control means for independently controlling active power and reactive power.

6. A wind power generation system in which a wind power generation apparatus having a wind turbine which receives wind and rotates, a generator which generates electric power by the rotating wind turbine, and a power converter which converts the electric power generated by the generator is electrically connected to a power system, wherein:

the wind power generation system comprises:

a voltage detector for detecting a voltage of the power system;

a reactive power command value generation unit for generating a first reactive power command value from a voltage detection value of the voltage detector; and a transmission unit for transmitting the first reactive power command value to the wind power generation apparatus, and the wind power generation apparatus comprises:

an interface device for receiving the first reactive power command value;

means for generating a second reactive power command value for suppression of voltage fluctuation by fluctuating output power of the generator;

reactive power command value addition means for adding the first reactive power command value to the second reactive power command value; and means for outputting reactive power according to a third reactive power command value output by the reactive power command value addition means.

7. The wind power generation system according to claim 6, wherein when a plurality of wind power generation apparatuses are electrically connected to the power system, a first wind power generation apparatus having small output active power in the plurality of wind power generation apparatuses outputs larger reactive power than a second wind power generation apparatus having large output active power.

8. The wind power generation system according to claim 6, wherein when the plurality of wind power generation apparatuses are electrically connected to the power system, a first wind power generation apparatus having large output active power in the plurality of wind power generation apparatuses outputs smaller reactive power than a second wind power generation apparatus having small output active power.

9. The wind power generation system according to claim 6, wherein:

the interface device receives a delay reactive power command value when the voltage detection value of the voltage detector is higher than a predetermined value;

the interface device receives an advance reactive power command value when the voltage detection value is lower than the predetermined value; and reactive power is output to the power system in such a way that the voltage detection value is within a predetermined range.

10. The wind power generation system according to claim 6, wherein the wind power generation apparatus comprises generated power control means capable of independently controlling active power and reactive power.

* * * * *